(12) United States Patent
Nakarmi et al.

(10) Patent No.: US 10,939,293 B2
(45) Date of Patent: Mar. 2, 2021

(54) AUTHENTICATING A MESSAGE IN A WIRELESS COMMUNICATION SYSTEM

(71) Applicant: Telefonaktiebolaget LM Ericsson (publ), Stockholm (SE)

(72) Inventors: Prajwol Kumar Nakarmi, Sollentuna (SE); Noamen Ben Henda, Stockholm (SE); Mats Folke, Vällingby (SE); Vesa Lehtovirta, Espoo (FI); Vesa Torvinen, Sauvo (FI); Monica Wifvesson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/096,747

(22) PCT Filed: Nov. 24, 2016

(86) PCT No.: PCT/EP2016/078698
§ 371 (c)(1),
(2) Date: Oct. 26, 2018

(87) PCT Pub. No.: WO2017/190815
PCT Pub. Date: Nov. 9, 2017

(65) Prior Publication Data
US 2019/0124509 A1    Apr. 25, 2019

Related U.S. Application Data

(60) Provisional application No. 62/330,456, filed on May 2, 2016.

(51) Int. Cl.
*H04W 12/06* (2009.01)
*H04W 12/10* (2021.01)
(Continued)

(52) U.S. Cl.
CPC ........... *H04W 12/06* (2013.01); *H04L 9/3236* (2013.01); *H04L 63/123* (2013.01); *H04W 12/10* (2013.01);
(Continued)

(58) Field of Classification Search
CPC ................ H04W 12/06; H04W 12/10; H04W 12/1006; H04W 12/1204; H04W 12/12;
(Continued)

(56) References Cited

U.S. PATENT DOCUMENTS

2008/0253569 A1 * 10/2008 Lim .................... H04L 9/3242
380/258
2014/0301228 A1 * 10/2014 Kwak .................. H04W 76/14
370/252
2015/0092696 A1    4/2015 Liu et al.

FOREIGN PATENT DOCUMENTS

EP    1432271 A2    6/2004
WO   2006123974 A1   11/2006
(Continued)

OTHER PUBLICATIONS

Information Sciences Institute, "Transmission Control Protocol", RFC 793, DARPA Internet Program, Protocol Specification, Sep. 1, 1981, pp. 1-90.
(Continued)

*Primary Examiner* — Kiet Tang
(74) *Attorney, Agent, or Firm* — Coats + Bennett, PLLC

(57) ABSTRACT

An authentication node (22) in a wireless communication system (10) authenticates a message received by a recipient radio node (16A) (e.g., a user equipment). The authentication node (22) in this regard determines a radio resource that carries the message received by the recipient radio node (16A). The authentication node (22) performs authentication of the message, by checking whether the message is bound
(Continued)

to the determined radio resource. The authentication node (22) may, for example, compute an expected authentication or integrity code based on information identifying the determined radio resource and check whether the expected authentication or integrity code matches an authentication or integrity code associated with the message.

14 Claims, 10 Drawing Sheets

(51) Int. Cl.
    *H04W 12/12*      (2021.01)
    *H04L 9/32*       (2006.01)
    *H04L 29/06*     (2006.01)
    *H04W 80/08*    (2009.01)

(52) U.S. Cl.
    CPC ... *H04W 12/1006* (2019.01); *H04W 12/1204* (2019.01); *H04L 2209/80* (2013.01); *H04W 12/12* (2013.01); *H04W 80/08* (2013.01)

(58) Field of Classification Search
    CPC .... H04W 80/08; H04L 9/3236; H04L 63/123; H04L 2209/80
    See application file for complete search history.

(56) References Cited

FOREIGN PATENT DOCUMENTS

WO    2009012281 A2    1/2009
WO    2017207075 A1   12/2017

OTHER PUBLICATIONS

IEEE Computer Society, "IEEE Standard for Information technology—Telecommunications and information exchange between systems—Local and metropolitan area networks—Specific requirements Part 11: Wireless LAN Medium Access Control (MAC) and Physical Layer (PHY) specifications Amendment 6: Medium Access Control (MAC) Security Enhancements", IEEE Std 802.11i, Jul. 23, 2004, pp. 1-190, IEEE.
Neuman, C., "The Kerberos Network Authentication Service (V5)", Network Working Group Request for Comments: 4120, Jul. 1, 2005, pp. 1-138, The Internet Society.
Touch, J., "The TCP Authentication Option", Internet Engineering Task Force (IETF), Request for Comments: 5925, Jun. 1, 2010, pp. 1-48, IETF.
Kent, S. et al., "Security Architecture for the Internet Protocol", Network Working Group, Request for Comments: 4301, Dec. 1, 2005, pp. 1-101, The Internet Society.
3rd Generation Partnership Project, "3rd Generation Partnership Project; Technical Specification Group Services and System Aspects; 3GPP System Architecture Evolution (SAE); Security architecture (Release 13)", Technical Specification, 3GPP TS 33.401 V13.2.0, Mar. 1, 2016, pp. 1-146, 3GPP.
3rd Generation Partnership Project, "3rd Generation Partnership Project; Technical Specification Group Services and System Aspects; Generic Authentication Architecture (GAA); Generic Bootstrapping Architecture (GBA) (Release 13)", Technical Specification, 3GPP TS 33.220 V13.0.0, Jan. 1, 2016, pp. 1-92, 3GPP.
3rd Generation Partnership Project, "3rd Generation Partnership Project; Technical Specification Group Services and System Aspects; Proximity-based Services (ProSe); Security aspects (Release 13)", Technical Specification, 3GPP TS 33.303 V13.3.0, Mar. 1, 2016, pp. 1-88, 3GPP.
3rd Generation Partnership Project, "3rd Generation Partnership Project; Technical Specification Group Radio Access Network; Evolved Universal Terrestrial Radio Access (E-UTRA); LTE physical layer; General description (Release 13)", Technical Specification, 3GPP TS 36.201 V13.1.0, Mar. 1, 2016, pp. 1-14, 3GPP.
3rd Generation Partnership Project, "3rd Generation Partnership Project; Technical Specification Group Radio Access Network; Evolved Universal Terrestrial Radio Access (E-UTRA); Physical channels and modulation (Release 13)", Technical Specification, 3GPP TS 36.211 V13.1.0, Mar. 1, 2016, pp. 1-155, 3GPP.
3rd Generation Partnership Project, "3rd Generation Partnership Project; Technical Specification Group Radio Access Network; Evolved Universal Terrestrial Radio Access (E-UTRA); Packet Data Convergence Protocol (PDCP) specification (Release 13)", Technical Specification, 3GPP TS 36.323 V13.0.0, Dec. 1, 2015, pp. 1-36, 3GPP.
3rd Generation Partnership Project, "3rd Generation Partnership Project; Technical Specification Group Radio Access Network; Evolved Universal Terrestrial Radio Access (E-UTRA); Radio Resource Control (RRC); Protocol specification (Release 13)", Technical Specification, 3GPP TS 36.331 V13.1.0, Mar. 1, 2016, pp. 1-551, 3GPP.
3rd Generation Partnership Project, "3rd Generation Partnership Project; Technical Specification Group Radio Access Network; Evolved Universal Terrestrial Radio Access (E-UTRA); Radio Link Control (RLC) protocol specification (Release 13)", Technical Specification, 3GPP TS 36.322 V13.1.0, Mar. 1, 2016, pp. 1-44, 3GPP.
Dierks, T. et al., "The Transport Layer Security (TLS) Protocol", Network Working Group, Request for Comments: 5246, Aug. 1, 2008, pp. 1-104, The IETF.
Telesystem Innovations, "LTE in a Nutshell: the Physical Layer", White Paper, Jan. 1, 2010, pp. 1-18, Telesystem Innovations Inc.

\* cited by examiner

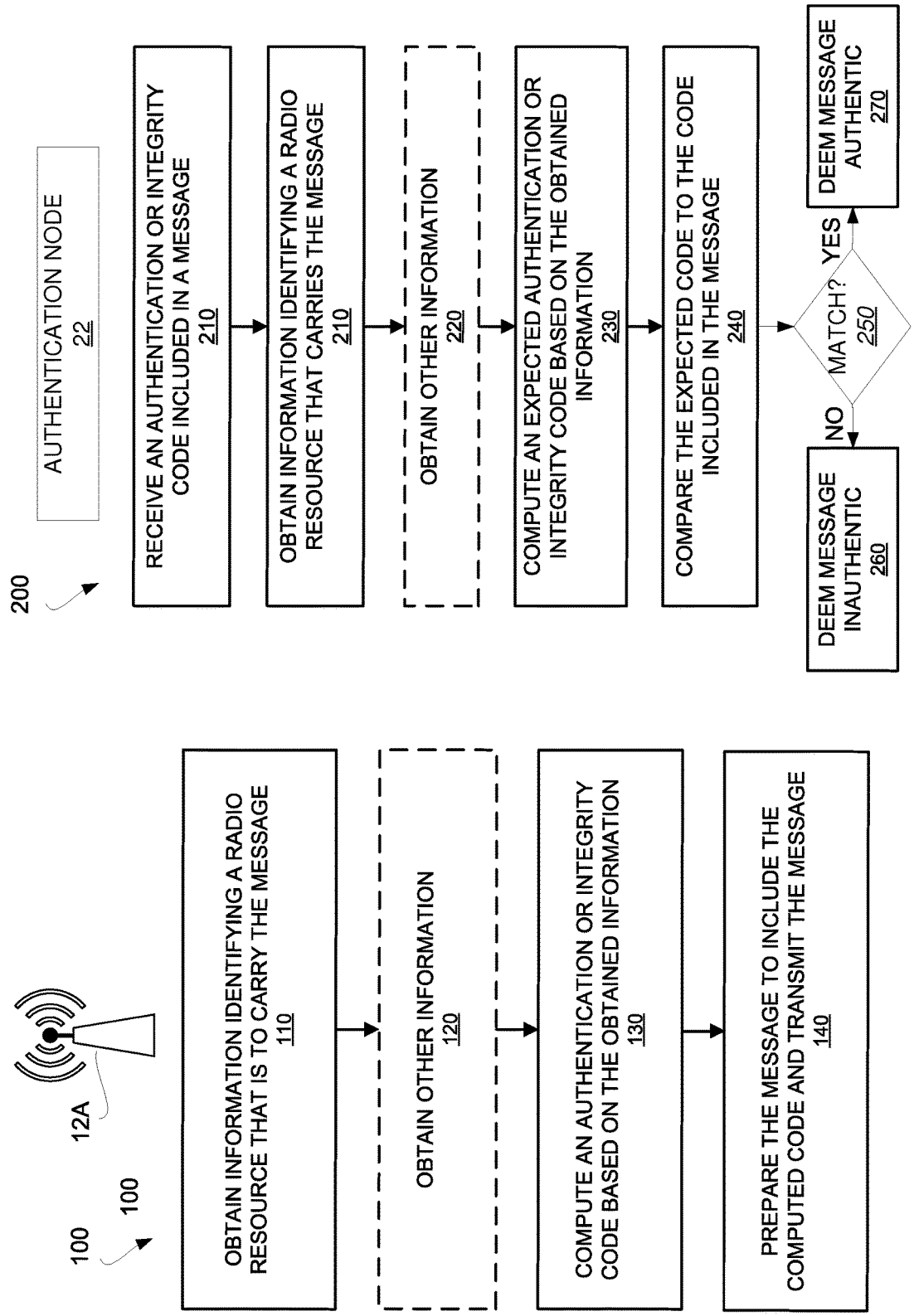

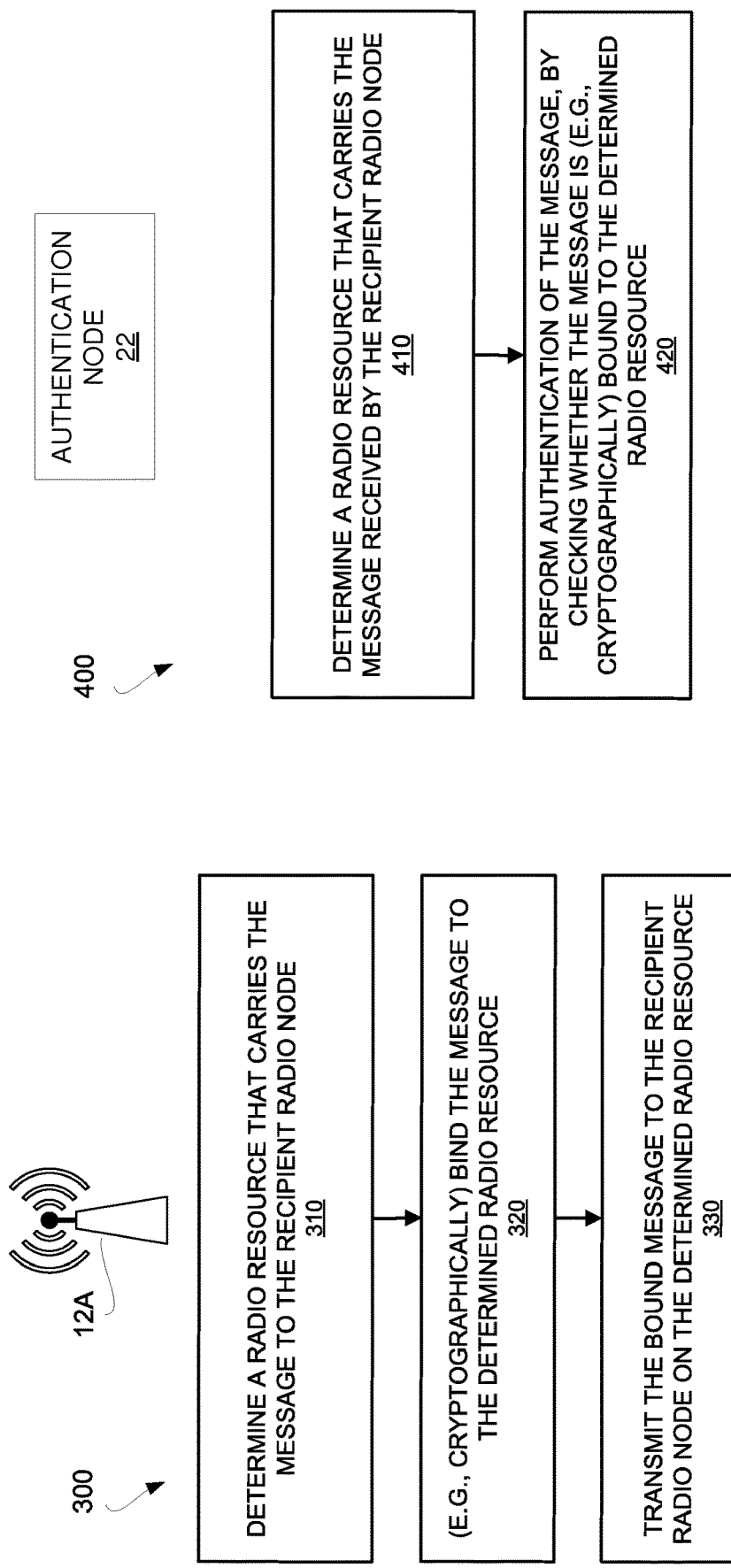

AUTHENTICATING A MESSAGE IN A WIRELESS COMMUNICATION SYSTEM

RELATED APPLICATIONS

This application claims priority to U.S. Provisional patent Application Ser. No. 62/330,456 filed May 2, 2016, the entire content of which is incorporated herein by reference.

TECHNICAL FIELD

The present application relates generally to a wireless communication system, and more particularly relates to authentication of a message in a wireless communication system.

BACKGROUND

In a radio transmission replay attack, a skillful attacker may capture one or more valid radio transmissions and retransmit them in the same or different geographic locations at different times. For example, an attacker can capture a valid Proximity Services (ProSe) discovery message over the air and trick user equipments (UEs) in a different geographic location by replaying the captured discovery message within 15 seconds. The radio transmission replay could enable an attacker to impersonate the source of transmission (both UE and network). Ultimately, undesirable consequences could occur, such as incorrect billing, false service information, personal injuries, and damage to service reputation, etc.

Authentication guards against a replay attack as well as other forms of attacks. Authentication in this regard operates to verify a message as being authentic in terms of its source or origin, e.g., so that an impersonator who intercepts a message and retransmits it is not mistaken for the actual origin of that message.

For example, a simple but insecure protection mechanism from replay attacks can be achieved using sequence numbers. Both the sender and the receiver maintain a counter which enables them to know if a message has already been received before. Such a mechanism can be seen in protocols such as 3GPP RLC [TS36322] and TCP [RFC793]. Even though the main intent of these protocols is to perform in-sequence delivery, reordering, and duplicate discarding of messages, using sequence numbers provides a basic protection mechanism from trivial replay attacks. However, the mechanism is insecure because there is no integrity-protection of the sequence number.

Security aware protocols such as 3GPP Packet Data Convergence Protocol (PDCP) [TS36323], IPsec [RFC4301], TCP-AO [RFC5925], TLS [RFC5246], and WPA [IEEE80211i] also use some form of a counter or sequence number. But these protocols are secure because the sequence number is integrity-protected using cryptographic measures.

Some other protocols or services use timestamp information, e.g. Kerberos [RFC4120] and 3GPP ProSe [T533303]. In Kerberos, an encrypted record called an authenticator includes a timestamp which proves that the message is not a replay. The requirement for the hosts is to have loose time synchronization. In 3GPP ProSe, discovery messages are integrity protected by using a UTC-based counter with a granularity of seconds. The 4 least significant bits of the counter is included in the message, which allows up to 15 seconds of offset between the clock used for ProSe at the sender and the receiver.

The existing protection mechanisms, of using protected sequence numbers and timestamps, may work well in some situations, but not in all. For example, using sequence numbers requires extra memory to store and increment the sequence number. The message size also needs to be increased to accommodate the sequence number. When the sender and the receiver are out of sync, resync is required. Messages in broadcast or stateless communication cannot be protected using sequence numbers because no state or book keeping of sequence numbers is maintained in such communication.

Using timestamps requires an additional source for timing information, for example, mobile network or GPS signals. The message size also needs to be increased to accommodate full or partial timestamp information. When the sender and the receiver are off sync by a larger value, the integrity check will fail and resync is required. When some offset is allowed, e.g. 15 seconds in case of ProSe, the same 15 seconds is available to an attacker, as well, to capture and replay the messages at a different location.

SUMMARY

One or more embodiments herein bind a message to a radio resource that carries the message for authentication purposes. In this way, the message is restricted to being carried by that bound radio resource in order for the message to be deemed authentic, such that its transmission or reception on a different radio resource renders the message inauthentic. In some embodiments, for example, the message is cryptographically bound with the radio resource that carries the message, e.g., via an authentication or integrity code. In this and other embodiments, authentication may be advantageously performed without resorting to synchronization or additional overhead in the message.

More particularly, embodiments herein include a method for authenticating a message received by a recipient radio node in a wireless communication system. The method is performed by an authentication node. The method comprises determining a radio resource that carries the message received by the recipient radio node. The method also comprises performing authentication of the message, by checking whether the message is bound to the determined radio resource.

In some embodiments, for example, this involves checking whether the message is cryptographically bound to the determined resource. In this and other embodiments, checking may entail for instance computing an expected authentication or integrity code based on information identifying the determined radio resource and checking whether the expected authentication or integrity code matches an authentication or integrity code associated with the message.

In some embodiments, this authentication or integrity code may be a message authentication code, a message integrity code, a message integrity check value, a checksum, an error detection code, a hash, a keyed hash, or a protected checksum.

In one embodiment, for example, the message is a radio resource control (RRC) message, and the authentication or integrity code associated with the message may be a Message Authentication Code for Integrity (MAC-I) or a Short-MAC-I associated with the RRC message. In this case, computing may comprise computing an expected MAC-I or ShortMAC-I based on information identifying the determined radio resource.

In another embodiment, the message is a Packet Data Convergence Protocol (PDCP) message, and the authentication or integrity code associated with the message may be a Message Authentication Code for Integrity (MAC-I) associated with the PDCP message. In this case, computing may comprise computing an expected MAC-I (X-MAC) based on information identifying the determined radio resource.

In still another embodiment, the message is a Proximity Services (ProSe) discovery message, and the authentication or integrity code associated with the message may be a Message Integrity Code (MIC) associated with the ProSe discovery message. In this case, computing may comprise computing an expected MIC based on information identifying the determined radio resource.

In some embodiments, checking comprises checking whether a radio resource on which the message was sent to the recipient radio node, or a radio resource on which the message was expected to be received by the recipient radio node, corresponds to a radio resource on which the message was received by the recipient radio node.

In some embodiments, the method further comprises receiving binding information indicating a radio resource on which a sender radio node transmitted the message to the recipient radio node. In this case, the determining may comprise determining the radio resource that carries the message as being a radio resource on which the recipient radio node received the message from the sender radio node, and the checking may comprise checking whether the radio resource on which the recipient radio node received the message corresponds to the radio resource on which the sender radio node transmitted the message, as indicated by the binding information.

In any of these embodiments, determining may comprise determining the radio resource that carries the message as being a radio resource on which the message is received by the recipient radio node. Alternatively, in any of these embodiments, determining may comprise determining the radio resource that carries the message as being a radio resource on which the message was expected to have been transmitted to the recipient radio node.

In some embodiments, the method comprises determining the radio resource on which the message was expected to have been transmitted to the recipient radio node, by: (i) determining a radio resource on which the message is received by the recipient radio node; and (ii) determining the radio resource on which the message was expected to have been transmitted to the recipient radio node, as being a radio resource which is offset by a determined amount from the radio resource on which the message is received by the recipient radio node. In one embodiment, for example, the determined amount is an amount of time associated with a timing advance with which the message is transmitted. Alternatively or additionally, the determined amount may be an amount of time associated with a guard period with which the message is transmitted.

In any of these embodiments, the method may further comprise transmitting to the recipient radio node information that indicates a result of said authentication or information whose transmission is conditioned upon the message being authenticated.

In any of these embodiments, the authentication node may be the recipient radio node. In this case, the method may further comprise receiving the message and processing the message responsive to authenticating the message.

In one or more embodiments, the method further comprises receiving binding information associated with the message. The binding information indicates a radio resource on which the message is restricted to being carried. In this case, checking may comprise checking whether the determined radio resource matches the radio resource indicated by the binding information.

Embodiments herein also include a corresponding method for securing transmission of a message from a sender radio node to a recipient radio node in a wireless communication system. The method is performed by the sender radio node. The method comprises determining a radio resource that carries the message to the recipient radio node. The method also comprises binding the message to the determined radio resource for authenticity. The method further comprises transmitting the bound message to the recipient radio node on the determined radio resource.

In some embodiments, this binding comprises generating binding information that indicates that the message is restricted to being carried on the determined radio resource, and the method further comprises transmitting the binding information to an authentication node configured to authenticate the message using the binding information.

In some embodiments, the sender radio node cryptographically binds the message to the determined radio resource. In this and other embodiments, for instance, binding may involve computing an authentication or integrity code based on information identifying the determined radio resource and transmitting the authentication or integrity code in association with the message for authentication of the message.

In some embodiments, this authentication or integrity code may be a message authentication code, a message integrity code, a message integrity check value, a checksum, an error detection code, a hash, a keyed hash, or a protected checksum.

In one embodiment, for example, the message is a radio resource control (RRC) message, and the authentication or integrity code transmitted in association with the message may be a Message Authentication Code for Integrity (MAC-I) or a ShortMAC-I associated with the RRC message.

In another embodiment, the message is a Packet Data Convergence Protocol (PDCP) message, and the authentication or integrity code transmitted in association with the message may be a Message Authentication Code for Integrity (MAC-I) associated with the PDCP message.

In still another embodiment, the message is a Proximity Services (ProSe) discovery message, and the authentication or integrity code transmitted in association with the message may be a Message Integrity Code (MIC) associated with the ProSe discovery message.

In some embodiments, binding comprises transmitting, to an authentication node distinct from the recipient radio node, binding information indicating a radio resource on which the message is to be transmitted to the recipient radio node or indicating a radio resource on which the message is expected to be received by the recipient radio node.

In some embodiments, the method's determining comprises determining the radio resource that carries the message as being a radio resource on which the message is to be transmitted to the recipient radio node.

In some embodiments, the method's determining comprises determining the radio resource that carries the message as being a radio resource on which the message is expected to be received by the recipient radio node.

In some embodiments, the method comprises determining the radio resource on which the message is expected to be received by the recipient radio node, by: (i) determining a radio resource on which the message is to be transmitted to the recipient radio node; and (ii) determining the radio resource on which the message is expected to be received by the recipient radio node, as being a radio resource which is offset by a determined amount from the radio resource on which the message is to be transmitted to the recipient radio node. In one embodiment, for example, the determined amount is an amount of time associated with a timing advance with which the message is transmitted. Alternatively or additionally, the determined amount is an amount of time associated with a guard period with which the message is transmitted.

In any of the above embodiments, the radio resource that carries the message may be a radio resource defined in at least the time domain. Alternatively or additionally, the radio resource that carries the message may be a radio resource defined in time over a radio frame.

In any of the above embodiments, the radio resource that carries the message may be a radio resource defined in time over a subframe, wherein a radio frame comprises multiple subframes.

In any of the above embodiments, the radio resource that carries the message may be a radio resource defined in time over a slot, wherein a subframe comprises multiple slots and wherein a radio frame comprises multiple subframes.

In any of the above embodiments, the radio resource that carries the message may be a radio resource defined in time over a symbol period, wherein a slot comprises multiple symbol periods, a subframe comprises multiple slots, and a radio frame comprises multiple subframes.

In any of the above embodiments, the radio resource that carries the message may be a radio resource defined in at least the frequency domain.

In any of the above embodiments, the radio resource that carries the message may be a radio resource defined at carrier frequency.

In any of the above embodiments, the radio resource that carries the message may be a radio resource defined at a subcarrier frequency.

In any of the above embodiments, the radio resource that carries the message may be a resource block defined in time over multiple consecutive symbol periods and defined in frequency over multiple consecutive subcarriers.

In any of the above embodiments, the radio resource that carries the message may be a resource element defined in time over a single symbol period and defined in frequency over a single subcarrier.

In any of the above embodiments, the wireless communication system may be a Long Term Evolution (LTE) system.

Embodiments herein further include corresponding nodes, computer programs, and carriers such as computer program products.

BRIEF DESCRIPTION OF THE DRAWINGS

FIG. 3 is a logic flow diagram of a method performed by a sender radio node according to some embodiments.

FIG. 4 is a logic flow diagram of a method performed by an authentication node according to some embodiments.

FIG. 8 is a logic flow diagram of a method performed by a sender radio node according to some embodiments.

FIG. 9 is a logic flow diagram of a method performed by an authentication node according to some embodiments.

DETAILED DESCRIPTION

Figure 1:
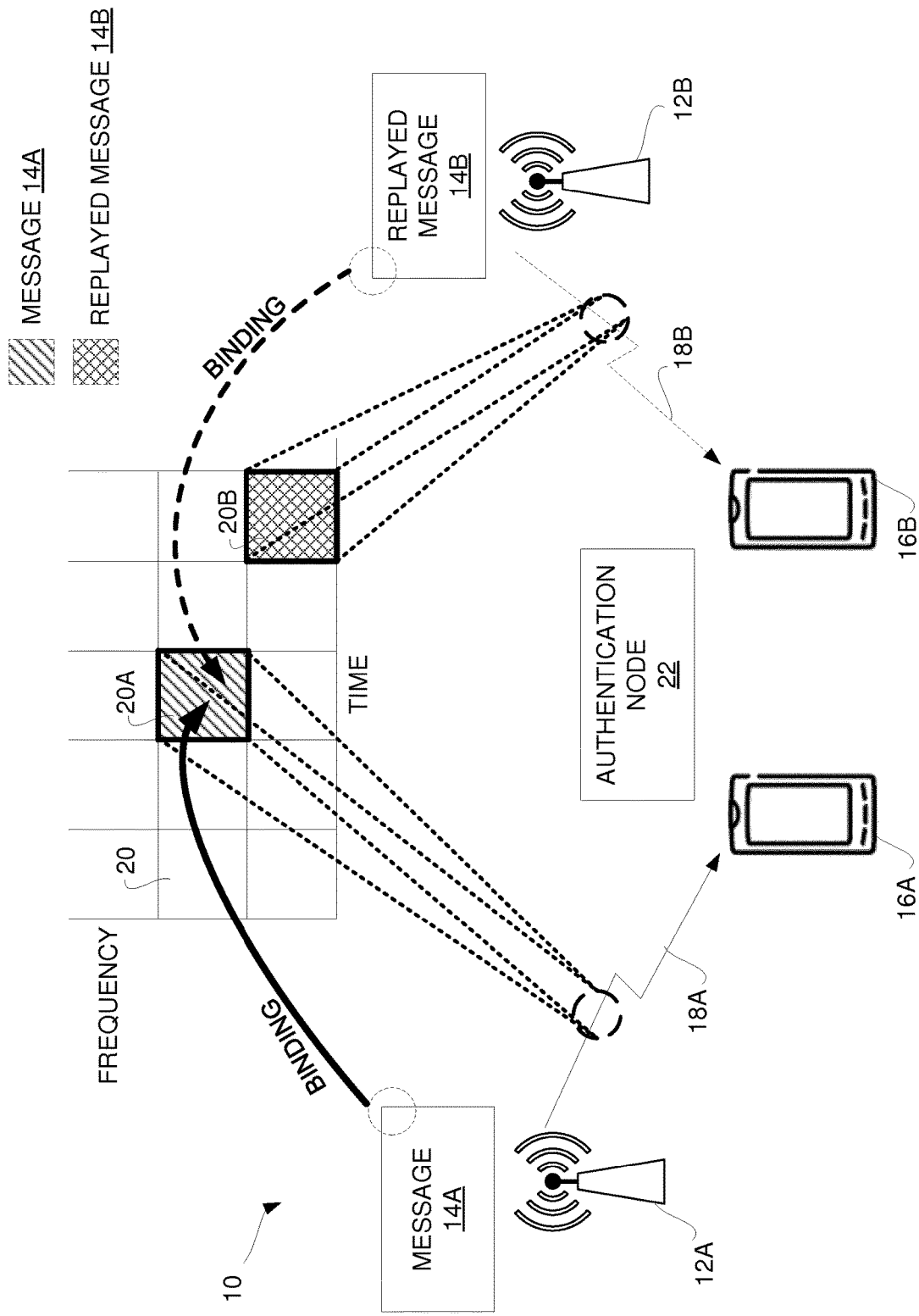
FIG. 1 is a block diagram of a wireless communication system that includes a sender radio node, a recipient radio node, and an authentication node according to one or more embodiments.

FIG. 1 illustrates a wireless communication system 10 (e.g., a Long Term Evolution, LTE, system) according to some embodiments. As shown, a sender radio node 12A in the system 10 transmits a message 14A for reception by a recipient radio node 16A, e.g., via a broadcast, multicast, or unicast radio channel. The sender radio node 12A does so by transmitting a radio signal 18A on a radio resource 20A. This radio resource 20A may be for instance selected from among multiple different possible radio resources 20, e.g., in the form of time-frequency resources as shown in FIG. 1. With the radio signal 18A transmitted on radio resource 20A, that radio resource 20A carries the message 14A.

Notably, the sender radio node 12A binds the message 14A to the radio resource 20A for authenticity. As used herein, binding a message to a radio resource for authenticity means restricting the message to being carried by that radio resource in order for the message to be deemed authentic, such that its transmission or reception on a different radio resource renders the message inauthentic. Correspondingly, then, an authentication node 22 in the system 10 judges or otherwise evaluates authenticity of the message 20A as received by the recipient radio node 16A, based on this binding. The authentication node 22 determines the radio resource that carries the message 20A received by the recipient radio node 16A, and performs authentication of the message 20A by checking whether the message 20A is bound to that determined radio resource.

In some embodiments where the authentication node 22 is the recipient radio node 16A itself, the authentication node 22 may process the message 16A responsive to authenticating the message 16A in this way. That is, if the recipient radio node 16A in its role as authentication node 22 deems the message 16A authentic due at least in part to the message 16A having been carried by the radio resource 20A that the message 16A was bound to be carried by, the recipient radio node 16A may substantively process the message 16A in a way that depends on the message's content. By contrast, if the message 16A is deemed inauthentic due at least in part to the message 16A having been carried by a radio resource that the message 16A was not bound to be carried by, the recipient radio node 16A may ignore or drop the message 16A, tear down a potentially compromised radio channel over which the message 16A was received, generate warning information, or take some other decisive action according to a security policy.

In other embodiments where the authentication node 22 is distinct from the recipient radio node 16A itself, the authentication node 22 may simply transmit to the recipient radio node 16A information that indicates a result of the authentication. Alternatively or additionally, the authentication node 22 may transmit to the recipient radio node 16A information whose transmission is conditioned upon the message being authenticated.

Regardless of the particular location of the authentication node 22, this authentication approach in some embodiments advantageously guards against a replay attack in which the message 14A is maliciously or fraudulently repeated or delayed, e.g., by an adversary who intercepts the message 14A and retransmits it. As shown in FIG. 1, for example, an adversarial radio node 12B may intercept message 14A and retransmit it as replayed message 14B to the same or a different recipient radio node 16B. This replayed message 14B may be identical in substance to the original message 14A. Regardless, the adversarial radio node 12B as shown does this by transmitting a radio signal 18B on a radio resource 20B. This radio resource 20B that carries the replayed message 14B differs from the radio resource 20A that carries the original message 14A, e.g., because the radio resource 20B occupies a different time resource and/or frequency resource. Yet the replayed message 14B is nonetheless still bound to the radio resource 20A that carries the original message 14A. Accordingly, the authentication node 22 (or a different authentication node not shown) may deem the replayed message 14B inauthentic responsive to determining that the replayed message 14B is bound to a radio resource 20A that differs from the radio resource 20B carrying the replayed message 14B.

No matter the particular type of attack that this authentication approach protects against, binding of the message 14A to the radio resource 20A may be accomplished in any number of ways. As described more fully below, for instance, the binding may be accomplished cryptographically, through a trusted third-party node distinct from the recipient radio node 16A, or the like.

In some embodiments, the sender radio node 12A accomplishes binding by generating binding information that indicates that the message 14A is restricted to being carried on the radio resource 20A. The sender radio node 12A then transmits this binding information to an authentication node 22 configured to authenticate the message 14A using that binding information. The authentication node 22 in this regard may receive the binding information associated with the message 14A. The authentication node 22 also determines the radio resource that carries the message 14A received by the recipient radio node 16A. The authentication node 22 may do so by identifying this carrying radio resource itself in embodiments where the authentication node 22 is the recipient radio node 16A. Alternatively, in embodiments where the authentication node 22 is distinct from the recipient radio node 16A, the authentication node 22 may do so by receiving information from the recipient radio node 16A indicating the radio resource that carries the message 14A. In either case, the authentication node 22 performs authentication of the message 14A, by checking whether the radio resource that carries the message 14A received by the recipient radio node 16A matches the radio resource 20A indicated by the binding information.

In one or more embodiments, this binding information explicitly identifies the radio resource 20A to which the associated message 14A is bound. In other embodiments, the binding information implicitly identifies or otherwise depends on the radio resource 20A to which the associated message 14A is bound.

Figure 2:
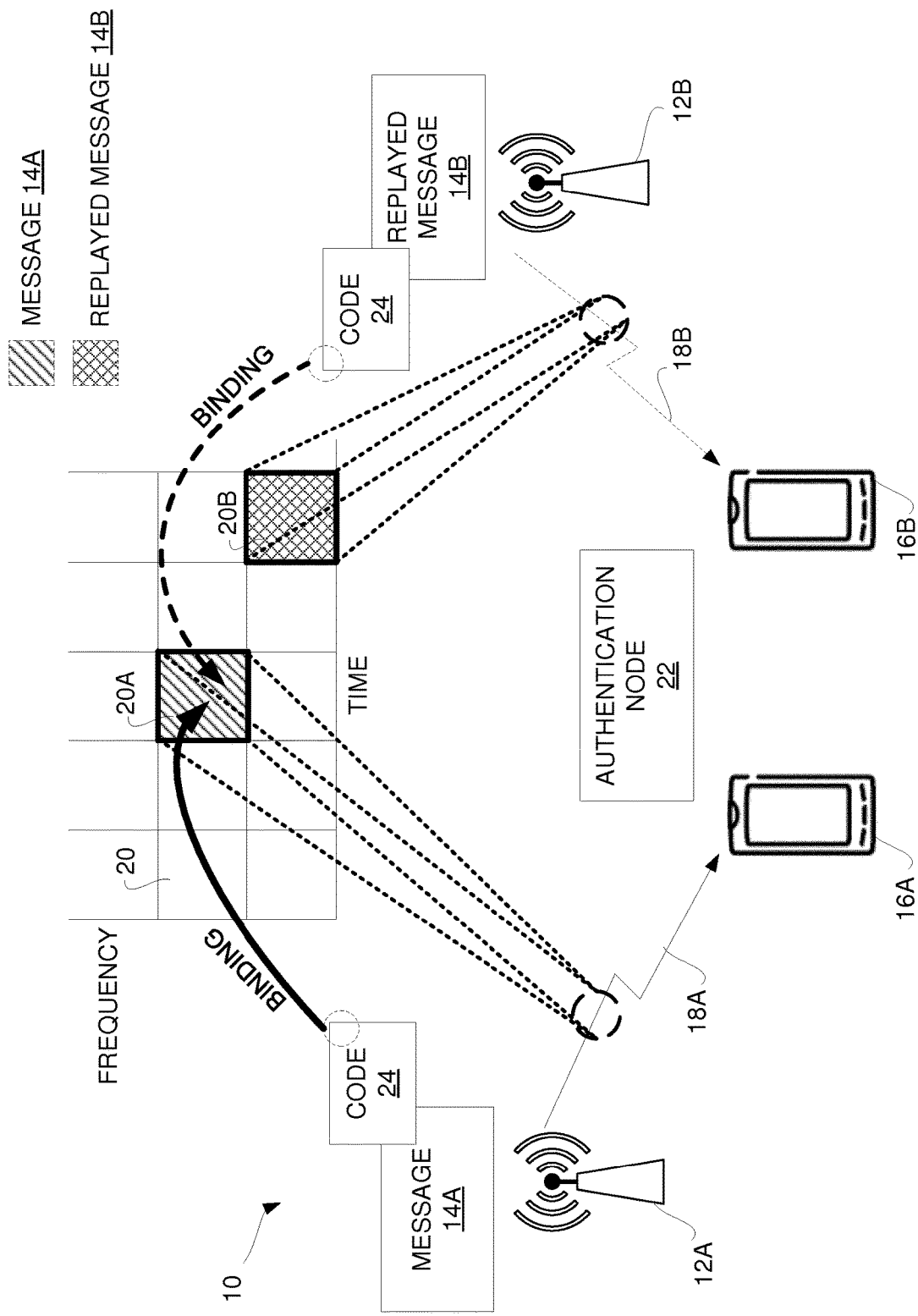
FIG. 2 is a block diagram of a wireless communication system in embodiments where authentication is performed using an authentication or integrity code.

As an example of these latter embodiments, for instance, the sender radio node 12A may cryptographically generate or otherwise encode the binding information based on information identifying the radio resource 20A. The binding information in some embodiments, for example, may be an authentication or integrity code (e.g., a message authentication code, MAC, or a message integrity code, MIC) that is associated with the message 14A. This code may be associated with the message 14A in the sense that it is a part of the message 14A (e.g., as a header in control information of the message 14A) or accompanies the message 14A (e.g., on an associated control channel). In this case, therefore, the message 14A is bound to its carrying radio resource 20A via the associated authentication or integrity code. FIG. 2 shows one example.

As shown in FIG. 2, the sender radio node 12A generates an authentication or integrity code 24 based on information identifying the radio resource 20A that is to carry the message 14A (and in some embodiments based on other information as well). The sender radio node 12A then transmits the authentication or integrity code 24 in association with the message 14A for authentication of the message 14A by the authentication node 22. In some embodiments, for example, the sender radio node 12A embeds or otherwise includes the code 24 in the message 14A itself (e.g., as control information in a header), such that the sender radio node 12A transmits both the code 24 and the message 14A together. Regardless, responsive to identifying the radio resource on which the message 14A is received by the recipient radio node 16A, the authentication node 22 independently computes an expected authentication or integrity code based on information identifying that radio resource. The authentication node 22 then checks (i.e., verifies) whether the expected code matches the authentication or integrity code 24 associated with the message 14A.

In at least some embodiments, this proves advantageous for protecting against replay attacks, since as shown in FIG. 2 the replayed message 14B will be associated with the same authentication or integrity code 24. Indeed, the authentication node 22 (or a different authentication node not shown) in this case will compute an expected authentication or integrity code based on information identifying the radio resource 20B that carries the replayed message 14B. Upon checking whether this expected code matches the code 24 associated with the replayed message 14B, the authentication node will determine that the expected code does not match the code 24 associated with the replayed message 14B and will deem the replayed message inauthentic. That is, because the code 24 associated with the replayed message 14B binds the replayed message 14B to the radio resource 20A that carries the original message 14A, transmission or reception of the replayed message 14B over a different radio resource 20B renders the replayed message 14B inauthentic.

FIGS. 3 and 4 in this regard illustrate methods 100, 200 performed by the sender radio node 12A and the authentication node 22 according to embodiments where the authentication or integrity code 24 is included in the message 14A itself. As shown in FIG. 3, the method 100 performed by the sender radio node 12A includes obtaining information identifying a radio resource 20A that is to carry the message 14A (Block 110). The method 100 may also include obtaining other information, e.g., other inputs for computing the code 24 (Block 120). Regardless, the method 100 further comprises computing the authentication or integrity code 24 based on the information obtained (i.e., in Block 110 and optionally Block 120) (Block 130). The method 100 then entails preparing the message 14A to include the computed code 24 and transmitting the message 14A (Block 140).

Correspondingly, the method 200 performed by the authentication node 22 includes receiving the authentication or integrity code 24 included in a message 14A or 14B. In embodiments where the authentication node 22 is the recipient radio node 16A or 16B itself, this may involve receiving the message 14A or 14B. In any event, the method 200 further comprises obtaining information identifying a radio resource 20A or 20B that carries the message 14A or 14B (Block 210). The method 200 may also involve obtaining other information (Block 220). Regardless, the method 200 includes computing an expected authentication or integrity code based on the obtained information (Block 230). The method 200 then entails comparing this expected code to the code 24 included in the message 14A or 14B (Block 240). If the codes do not match (NO at Block 250), the method 200 deems the message 14B inauthentic (Block 260). By contrast, if the codes do match (YES at Block 250), the method 200 deems the message 14A authentic (Block 270).

Note that, in this and other embodiments, inclusion of the authentication or integrity code 24 in the message 14A differs from actually including in the message information that explicitly indicates the message's carrying radio resource 20A. Indeed, the authentication or integrity code 24 only implicitly indicates the message's carrying radio resource 20A by way of the code 24 being computed based on that resource 20A. Moreover, in some embodiments, the authentication or integrity code 24 is included in the message 14A irrespective of whether the authentication approach herein is implemented. In this case, therefore, the authentication approach adds no additional overhead to the message 14A. That is, unlike authentication approaches that rely on sequence numbers or timestamps, these embodiment do not require additional control signaling in the message 14A and do not require the authentication node 22 or the recipient radio node 16A to read or extract explicit radio resource information from the message 14A. It is sufficient to use the radio resource information that the recipient radio node 16A already has, by way of its reception of the message 14A, in the calculation of the expected authentication or integrity code. Correspondingly, the sender radio node 12A is not required to include radio resource information in the transmitted message 14, since it is sufficient for the sender radio node 12A to use that information in the calculation of the code 24.

Figure 5A:
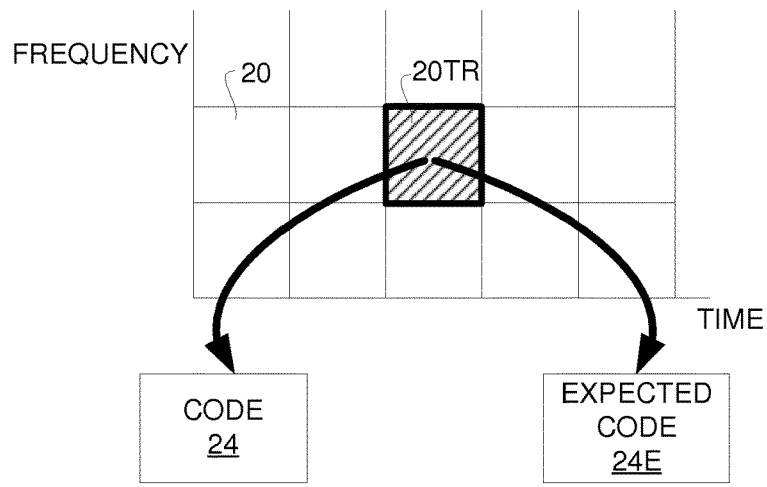
FIG. 5A is a block diagram illustrating computation of an authentication or integrity code according to some embodiments.

Note also that in at least some embodiments the radio resource 20 that carries a message is the same resource from both the perspective of the sender radio node and the recipient radio node (and authentication node 22). An example of these embodiments is shown in FIG. 5A, in a context where a radio resource comprises a time-frequency resource and using the original (i.e., authentic) message 14A for illustration. As shown, the radio resource 20T on which the sender radio node 12A transmits the message 14A is the same radio resource 20R on which the recipient radio node 16A receives the message 14A. The radio resource is therefore appropriately shown in FIG. 5A as radio resource 20TR. In this case, then, the authentication node 22 according to some embodiments herein effectively checks by way of the resource binding whether the radio resource on which a message was sent to the recipient radio node 16A matches or otherwise corresponds to the radio resource on which the message was received by the recipient radio node 16A.

For example, as shown in FIG. 5A, the sender radio node 12A may compute the authentication or integrity code 24 based on information identifying the radio resource 20TR on which the original message 14A is transmitted, and the authentication node 22 may compute an expected authentication or integrity code 24E based on information identifying the radio resource 20TR on which the original message 14A is received. More generally, the sender radio node 12A may generate binding information indicating the radio resource 20TR on which the message 14A is transmitted, and the authentication node 22 may check whether the radio resource 20TR on which the recipient radio node 16A receives the message 14A corresponds to the radio resource 20TR indicated by that binding information.

Figure 5B:
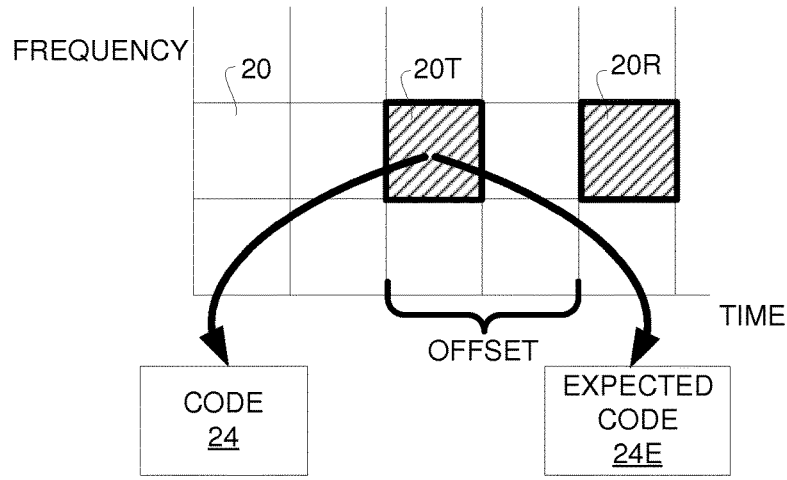
FIG. 5B is a block diagram illustrating computation of an authentication or integrity code according to other embodiments.

In other embodiments, though, the radio resource 20 that carries the message 14A may be a different resource from the perspective of the sender radio node and the recipient radio node (and authentication node 22). As shown in FIG. 5B, for example, the recipient radio node 16A receives the message 14A on a radio resource 20R that is offset in time from the radio resource 20T on which the sender radio node 12A transmitted the message 14A. This offset may be for example an amount of time associated with a timing advance or guard period with which the message 14A is transmitted. Regardless, the sender radio node 12A and/or the authentication node 22 may take this offset into account for authentication, e.g., when computing the codes 24 and 24E. As shown in FIG. 5B, for instance, the recipient radio node 16A takes this offset into account when computing the expected code 24E. In particular, even though the recipient radio node 16A receives the message 14A on radio resource 20R, the authentication node 22 nonetheless computes the expected code 24E based on information identifying the radio resource 20T on which the sender radio node 12A transmitted or is estimated to have transmitted the message 14A. The authentication node 22 in this regard may determine the radio resource 20T as being a radio resource which is offset by a determined amount from the radio resource 20R on which the message 14A is received by the recipient radio node 16A. This determined amount may be predefined or dynamically computed, e.g., based on a random access procedure.

Figure 5C:
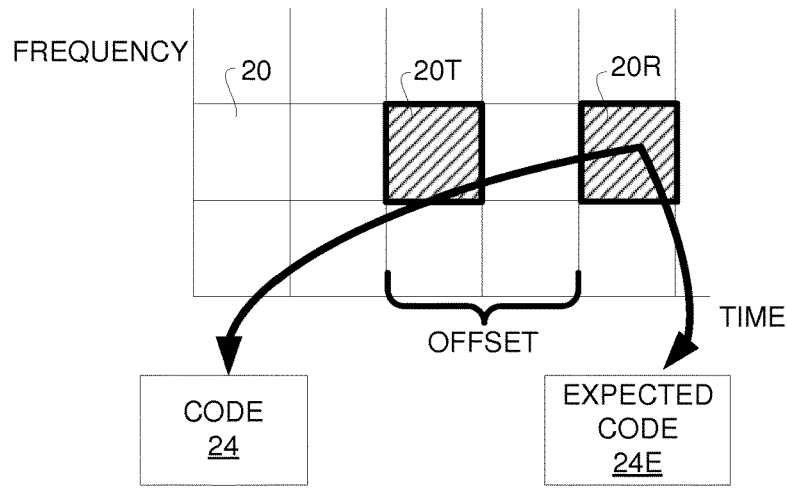
FIG. 5C is a block diagram illustrating computation of an authentication or integrity code according to still other embodiments.

FIG. 5C shows another example where the sender radio node 12A is the node that takes the offset into account for authentication. As shown, the sender radio node 12A even though the sender radio node 12A transmits the message 14A on radio resource 20T, the sender radio node 12A nonetheless computes the code 24 based on information identifying the radio resource 20R on which the recipient radio node 16A is estimated to receive the message 14A. The sender radio node 12A in this regard may determine the radio resource 20R as being a radio resource which is offset by a determined amount from the radio resource 20T on which the message 14A is transmitted by the sender radio node 12A. This determined amount may be predefined or dynamically computed, e.g., based on a random access procedure.

Note that although FIGS. 5B and 5C illustrate examples where either the sender radio node 12A or the authentication node 22 accounts for the offset, in other embodiments both the sender radio node 12A and the authentication node 22 do so (e.g., by each accounting for a portion of the offset). Also note that, though FIGS. 5B and 5C illustrate the offset in the time domain, the offset may alternatively or additionally be defined in any domain (e.g., frequency, code, or the like).

Further note that, while many of the above figures illustrate a radio resource in the form of a time-frequency resource, a radio resource herein constitutes any resource on which a message is carried via a radio signal. A radio resource may therefore be defined in any one or more domains, including for instance the time domain, frequency domain, code domain, spatial domain, or the like. Moreover, even if a message is in fact carried by a radio resource defined in multiple domains, binding herein need not be performed in all domains defining that resource. For example, where a message is in fact carried by a time-frequency resource formed from the combination of a time resource and a frequency resource, the message may be bound only to the time resource, only to the frequency resource, or to both the time resource and the frequency resource.

Figure 6A:
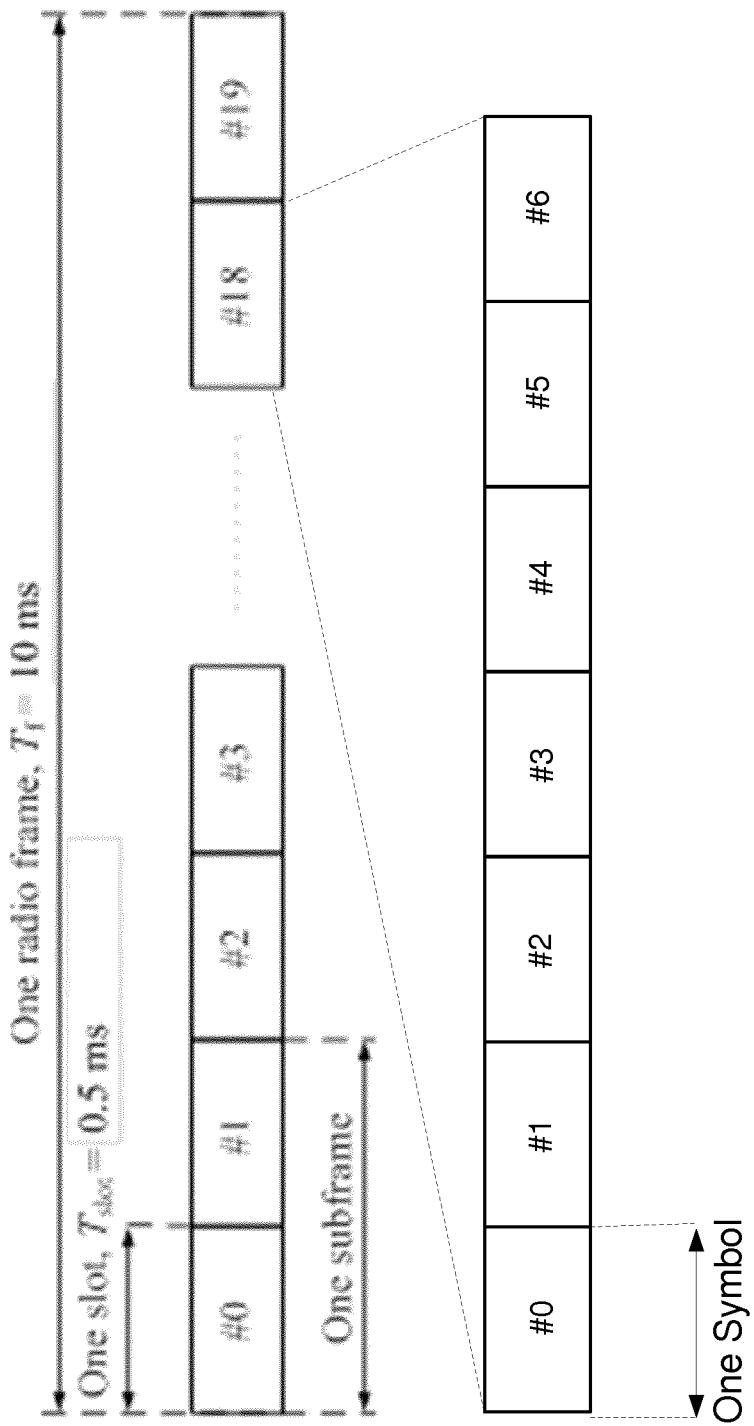
FIG. 6A is a block diagram of a time structure that divides the time domain into radio frames according to some embodiments.

Also in this regard, a radio resource herein may be specified at any level of granularity or resolution. FIG. 6A for instance illustrates one example where a radio resource 20 is defined in at least the time domain. As shown, a sending radio node 12A performs transmissions according to a time structure that divides the time domain into radio frames, e.g., of 10 ms each. These radio frames may be indexed according to a system frame number (SFN), which may periodically repeat (e.g., SFN range may be 0 to 1023 which rounds off in 10 second intervals). The radio frames may have different structures for frequency division duplexing (FDD), time division duplexing (TDD), licensed assisted access (LAA), or the like, where FIG. 5A focuses for simplicity on the FDD scenario. Regardless, each radio frame divides into multiple subframes (e.g., of 1 ms each), and each subframe divides into multiple slots (e.g., of 0.5 ms each). In some embodiments, each slot divides into multiple symbols (e.g., 6 or 7 OFDM or SC-FDMA symbols). In this and other time domain structures, a radio resource 20 that carries the message 14A and to which the message 14A is bound may be defined in time over a radio frame. Alternatively, a radio resource 20 that carries the message 14A and to which the message 14A is bound may be defined in time over a subframe, a slot, or a symbol. That is, a radio resource to which a message may be bound may be defined at any level of granularity shown in FIG. 6A.

A radio resource to which a message is bound may alternatively or additionally be defined in at least the frequency domain. The radio resource may for instance be defined at a frequency band or carrier frequency granularity, e.g., as indicated by a band number, a band name, a E-UTRA Absolute Radio Frequency Channel Number (EARFCN), etc. In other embodiments, the radio resource may be defined at a subcarrier granularity, e.g., as indicated by a subcarrier number. A subcarrier in some embodiments may have a bandwidth of 15 kHz or 7.5 kHz.

Figure 6B:
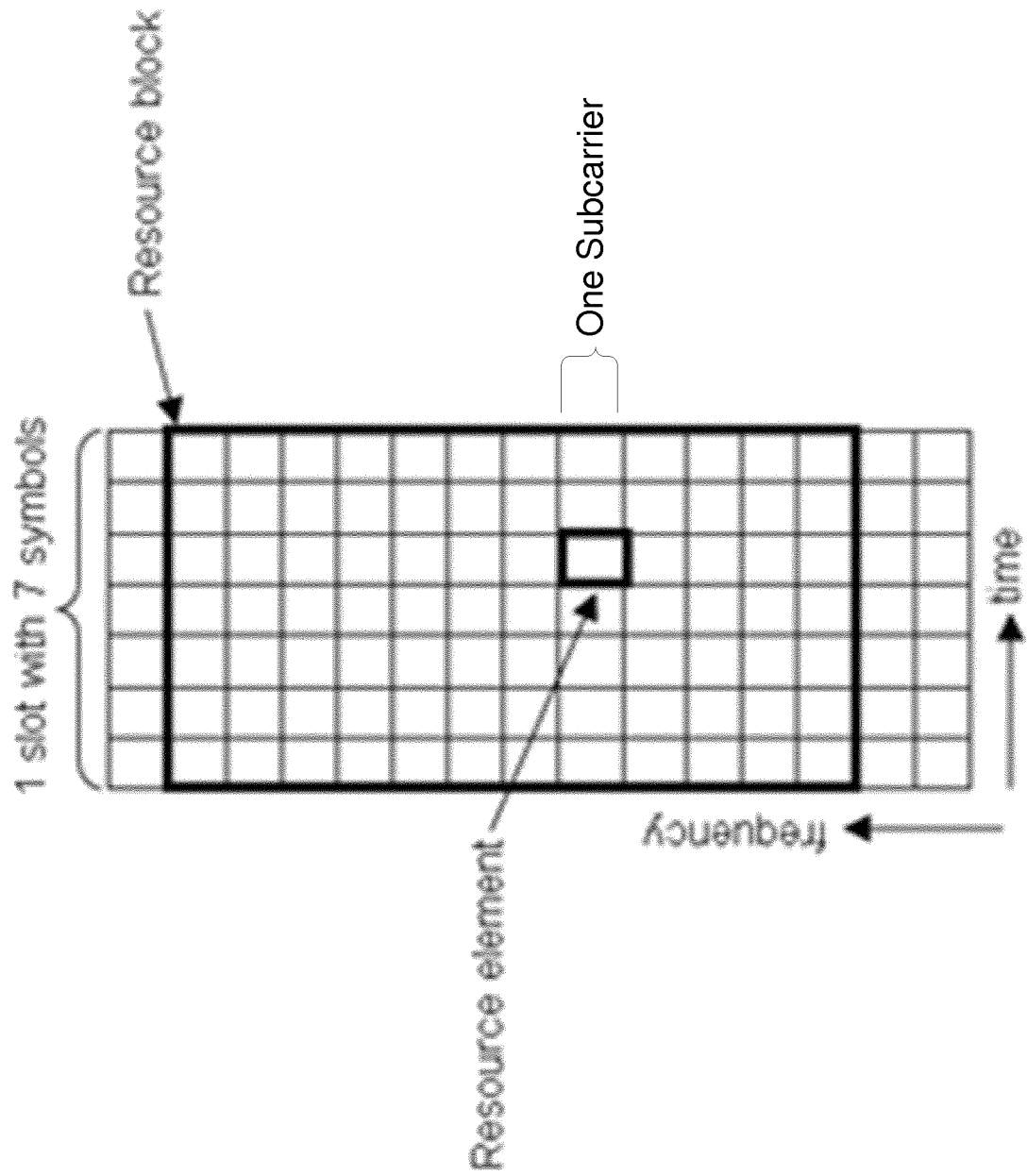
FIG. 6B illustrates a time-frequency grid according to which transmission are made in some embodiments.

A radio resource to which a message is bound may also be defined in both the time domain and the frequency domain. FIG. 6B illustrates one example where the transmissions are performed on a time-frequency grid. As shown, one resource block consists of consecutive subcarriers in the frequency domain (e.g., 12 or 24 in number over 180 kHz) and consecutive symbols in the time domain (e.g., up to 7 in number over one slot). Resource blocks may be numbered from 0. One resource element is defined by a pair of time and frequency indices in a resource block. A resource element specifies a combination of a subcarrier in the frequency domain and a symbol within a slot in the time domain. See, e.g., 3GPP TS 36.201 and 3GPP TS 36.211 for LTE examples. In this and other time-frequency structures, a radio resource 20 that carries the message 14A and to which the message 14A is bound may be a resource block. Alternatively, a radio resource 20 that carries the message 14A and to which the message 14A is bound may be a resource element. That is, a radio resource to which a message may be bound may be defined at any level of granularity shown in FIG. 6B.

Note that the resource granularity at which a message is bound may affect the degree to which the message is protected against a replay attack. For example, if a message is bound to only the carrier frequency that carries the message, a replayed message would be rendered inauthentic when carried by a different carrier frequency, but may be deemed authentic if carried by the same carrier frequency. To mitigate against this issue, a finer granularity may be specified for binding. For instance, a message may be bound to not only a carrier frequency but also a system frame number (SFN) indicating a radio frame that carries the message. In this case, then, a replayed message may not be deemed authentic even if it is carried by the same carrier frequency, as long as it is carried by a different radio frame with a different SFN. If the SFN rounds off (i.e., starts over) in 10 second intervals, for instance, an attacker may have a 10 ms window to replay the message in some cases. Even finer granularity may be specified, then, such as by binding a message to a slot number along with the carrier frequency and SFN. This would give an attacker only a 0.5 ms window after every 10 ms to replay the message.

Further note that a message may be bound to a radio resource at any transmission layer of a protocol stack through which the message passes. Any layer may for instance compute an authentication or integrity code 24 or an expected authentication or integrity code for verification. Radio resource information identifying the radio resource to which the message is to be bound may be delivered or provided to this layer on demand (e.g., when the actual transmission or reception happens) or in advance (e.g., when the future transmission or reception is known beforehand).

In some embodiments, radio resource binding is handled at a radio resource control (RRC) layer with respect to an RRC message. In this regard, during the process of RRC connection re-establishment, the RRC layer includes a field called ShortMAC-I for the identification and verification of a user equipment (UE). The ShortMAC-I is the 16 least significant bits of the MAC-I calculated with inputs including cell identity, physical cell identity, and Cell Radio Network Temporary Identifier (C-RNTI) among others. The actual algorithms for the generation of MAC-I is specified in 3GPP TS 33.401. For more details, 3GPP TS 36.331 should be referred to.

The radio resource information in some embodiments is used as yet another input to the calculation of the ShortMAC-I or MAC-I. The radio resource information may be provided to the RRC layer in any number of ways, e.g., via System Information Block (SIB) messages or from a lower layer (e.g. Medium Access Control).

Figure 7:
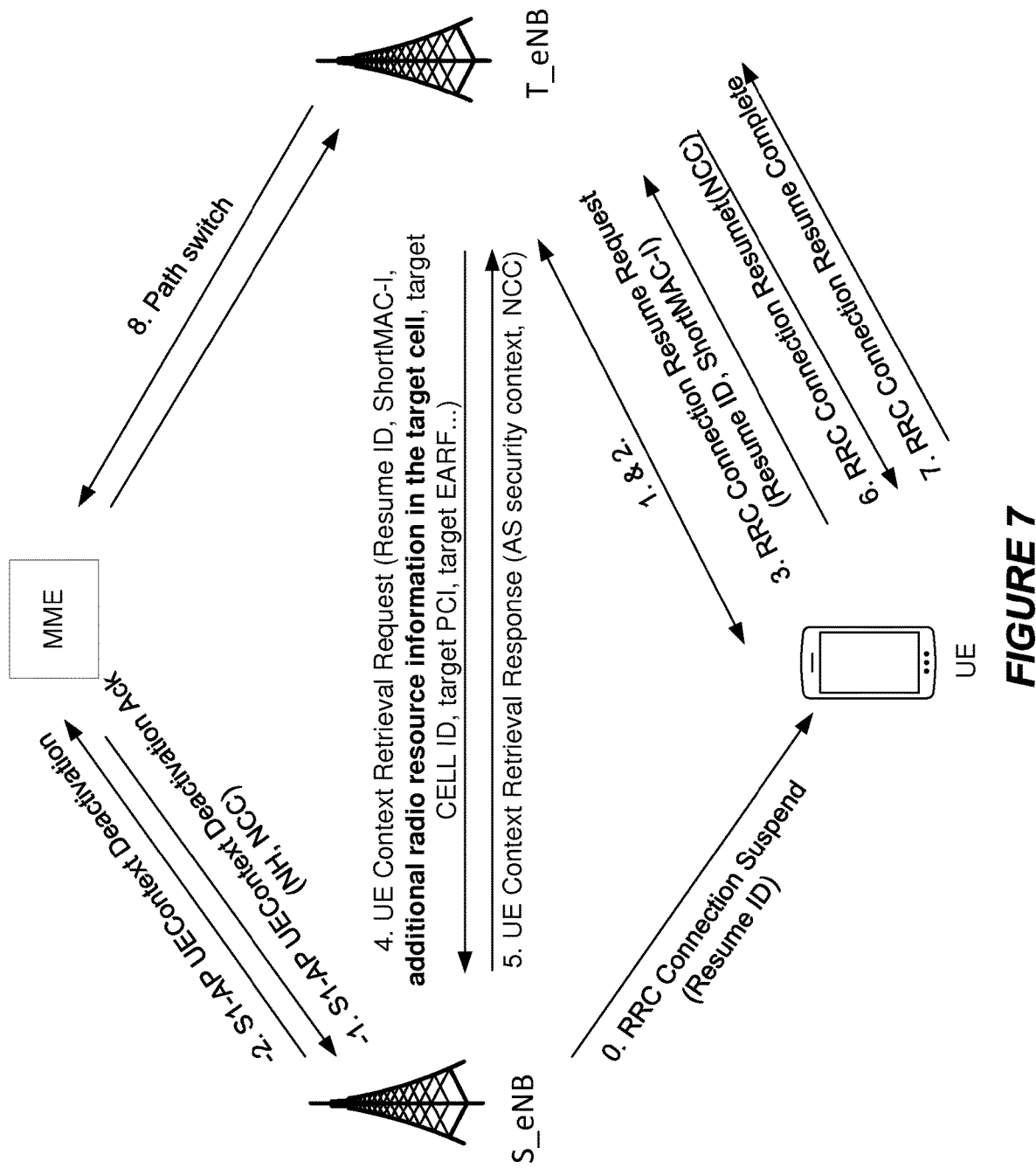
FIG. 7 is a block diagram of a wireless communication system in which a ShortMAC-I is used in an RRC Connection Resume procedure according to some embodiments.

As a more concrete example, potential use of using ShortMAC-I in RRC Connection Resume procedure is described in FIG. 7 where radio resource binding can mitigate against replayed messages. In step 3 of FIG. 7, when a UE decides to resume the RRC connection, the user equipment (UE) acting in the role of a sending radio node 12A generates a RRC Connection Resume Request message to be sent to a target eNB acting in the role of a recipient radio node 16A. As part of generating the message, the UE calculates a ShortMAC-I for inclusion in the RRC Connection Resume Request message. Radio resource information indicating a radio resource that is to carry the RRC Connection Resume Request message from the perspective of the UE is used as an input to the calculation of the Short-MAC-I by the UE.

When the target eNB as recipient radio node 16A receives the RRC Connection Resume Request message in step 3 from the UE, the target eNB contacts a source eNB with a UE Context Retrieval Request message in step 4. The target eNB includes in the UE Context Retrieval Request message the ShortMAC-I together with radio resource information indicating a radio resource that carried the RRC Connection Resume Request message to the target eNB. The source eNB acting in the role of the authentication node 22 checks and verifies the ShortMAC-I using the radio resource information included in the UE Context Retrieval Request message. If the check of ShortMAC-I is successful in the source eNB, then the source eNB acting as the authentication node 22 retrieves the UE context and forwards it to the target eNB.

Note that the target eNB in FIG. 7's example may be the same eNB as the source eNB. In this case, the same description as above applies except that step 4 and step 5 do not take place. Still, the source eNB checks and verifies the ShortMAC-I together with the additional radio resource information in the target cell.

As another example, the PDCP layer may handle resource binding and authentication. In this case, the authentication or integrity code 24 generated by the sending radio node 12A may be referred to as MAC-I and the expected authentication or integrity code computed by the authentication node 22 may be referred to as X-MAC. The actual algorithms for the generation of MAC-I or X-MAC are specified in 3GPP TS 33.401. For more details, 3GPP TS 36.323 should be referred to. In any event, the radio resource information may be used as yet another input to the calculation of the MAC-I or X-MAC. The radio resource information may be provided to the PDCP layer in any number of ways, e.g., via System Information Block (SIB) messages or from a lower layer (e.g. Medium Access Control).

As yet another example, a discovery message in ProSe is protected by message integrity code (MIC). A sender (i.e. announcing or discoveree UE) does the MIC calculation and either a receiver (i.e. monitoring or discoverer UE) or a ProSe function (i.e. via Match Report) does the MIC verification. A UTC-based counter is used as one of the inputs to the calculation of the MIC, and the 4 least significant bits of the counter is included in the message. Including 4 bits, allows up to 15 seconds of offset between the clock used for ProSe at the sender and the receiver. The actual key derivation function (KDF) which is used for calculation of MIC is specified in 3GPP TS 33.220. For more details, 3GPP TS 33.303 should be referred to.

Regardless, the radio resource information may be used as yet another input to the calculation of the MIC value. There are many ways to provide the radio resource information to the ProSe function in the network. For example: via PC3 interface, from RRC layer, or from MAC layer in the UE. When the MIC verification is done in the ProSe function, the receiver (i.e. monitoring or discoverer UE) can include the recipient radio resource information in its Match Report to the ProSe function.

Note that in view of the above possible modifications and variations, an authentication or integrity code may be referred to as MAC, MIC, a message integrity check value, a checksum, an error detection code, a hash, a keyed hash, a protected checksum, or the like.

Note that despite examples in an LTE system, embodiments herein are not constrained to the LTE technology. In a narrowband Internet of Things (NB-IoT) or future 5G system, the radio resources might be organized differently and might have different names, but the concept of using some form of radio resource binding for message authentication (e.g., in the calculation of an authentication or integrity code) will be equally applicable.

A radio node herein is any type of node (e.g., a base station or wireless communication device) capable of communicating with another node over radio signals. A radio network node is any type of radio node within a wireless communication network, such as a base station. A wireless communication device is any type of radio node capable of communicating with a radio network node over radio signals. A wireless communication device may therefore refer to a machine-to-machine (M2M) device, a machine-type communications (MTC) device, a NB-IoT device, etc. The wireless device may also be a user equipment (UE), however it should be noted that the UE does not necessarily have a "user" in the sense of an individual person owning and/or operating the device. A wireless device may also be referred to as a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but are generally configured to transmit and/or receive data without direct human interaction.

In an IOT scenario, a wireless communication device as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a wireless communication device as described herein may be comprised in a vehicle and may perform monitoring and/or reporting of the vehicle's operational status or other functions associated with the vehicle.

An authentication node 22 herein may by any node in the system 10, and may be the same as the recipient radio node 16A or may be distinct from the recipient radio node 16A. The authentication node 22 may be for instance a base station, e.g., the source base station of a handover. Alternatively, the authentication node 22 may be a node that implements a ProSe function.

In view of the above modifications and variations, FIGS. 8 and 9 illustrate methods 300, 400 respectively performed by a sender radio node 12A and an authentication node 22 according to one or more embodiments. As shown in FIG. 8, the sender radio node 12A performs a method 300 for securing transmission of a message from the sender radio node 12A to a recipient radio node 16A in a wireless communication system 10. The method 300 comprises determining a radio resource 20A that carries the message 14A to the recipient radio node 16A (Block 310). The method 300 also comprises (e.g., cryptographically) binding the message 14A to the determined radio resource 20A for authenticity (Block 320). The method 300 further comprises transmitting the bound message 14A to the recipient radio node 16A on the determined radio resource 20A (Block 330).

As shown in FIG. 9, the authentication node 22 performs a method 400 for authenticating a message received by a recipient radio node in a wireless communication system 10. The method 400 comprises determining a radio resource that carries the message received by the recipient radio node (Block 410). The method 400 further comprises performing authentication of the message, by checking whether the message is (e.g., cryptographically) bound to the determined radio resource (Block 420).

Note that a sending radio node 12A (e.g., base station or a wireless communication device such as a UE) as described above may perform the method 100 in FIG. 3 or the method 300 in FIG. 8 and any other processing herein by implementing any functional means or units. In one embodiment, for example, the sending radio node 12A comprises respective circuits or circuitry configured to perform the steps shown in FIG. 3 or FIG. 8. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 10:
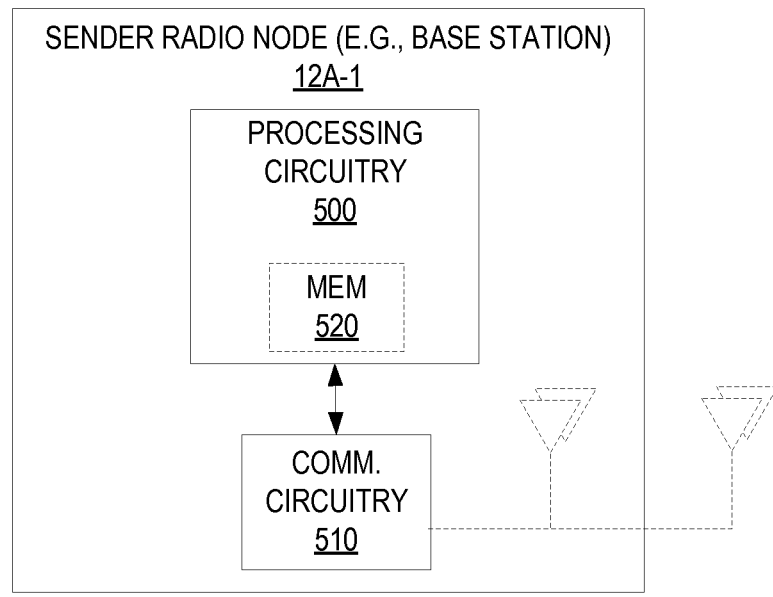
FIG. 10 is a block diagram of a sender radio node according to some embodiments.

FIG. 10 illustrates the sending radio node 12A in the form of a sending radio node 12A-1 in accordance with one or more embodiments. As shown, the sending radio node 12A-1 includes processing circuitry 500 and communication circuitry 510. The communication circuitry 510 is configured to transmit and/or receive information to and/or from one or more other nodes, e.g., via any communication technology. Such communication may occur via one or more antennas that are either internal or external to the sending radio node 12A-1. The processing circuitry 500 is configured to perform processing described above, e.g., in FIG. 3 or FIG. 8, such as by executing instructions stored in memory 520. The processing circuitry 500 in this regard may implement certain functional means, units, or modules.

Figure 11:
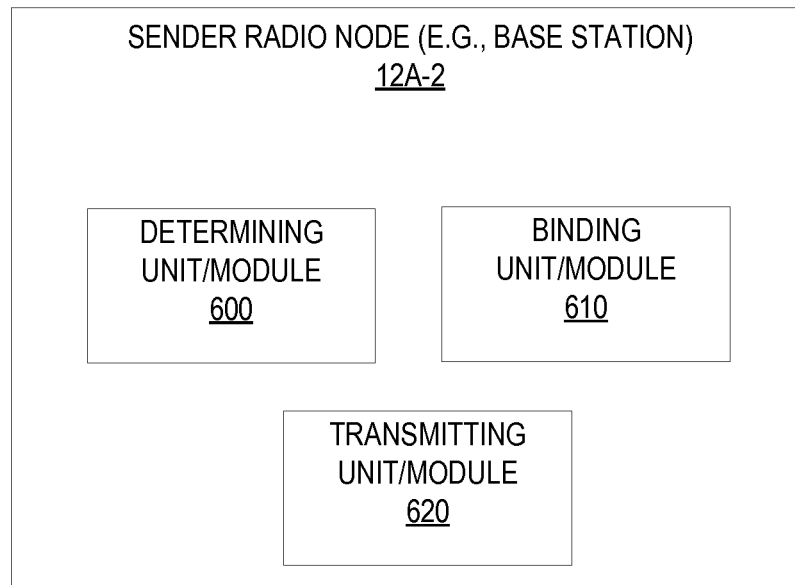
FIG. 11 is a block diagram of a sender radio node according to other embodiments.

FIG. 11 illustrates the sending radio node 12A in the form of a sending radio node 12A-2 implemented in accordance with one or more other embodiments. As shown, the sending radio node 12A-2 implements various functional means, units, or modules, e.g., via the processing circuitry 500 in FIG. 10 and/or via software code. These functional means, units, or modules, e.g., for implementing the method in FIG. 8, include for instance a determining module or unit 600 for determining a radio resource that carries the message to the recipient radio node. Also included is a binding module or unit 610 for (e.g., cryptographically) binding the message to the determined radio resource for authenticity. Further included is a transmitting module or unit 620 for transmitting the bound message to the recipient radio node on the determined radio resource.

Also note that an authentication node 22 (e.g., a base station or a wireless communication device such as a user equipment) as described above may perform the method 200 in FIG. 4 or the method 400 in FIG. 9 and any other processing herein by implementing any functional means or units. In one embodiment, for example, the authentication node 22 comprises respective circuits or circuitry configured to perform the steps shown in FIG. 4 or FIG. 9. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 12:
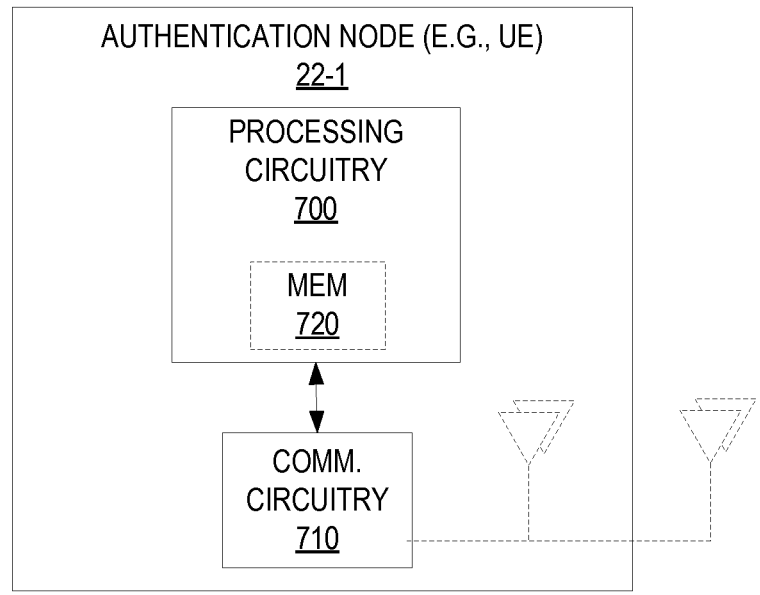
FIG. 12 is a block diagram of an authentication node according to some embodiments.

FIG. 12 illustrates the authentication node 22 in the form of an authentication node 22-1 in accordance with one or more embodiments. As shown, the authentication node 22-1 includes processing circuitry 700 and communication circuitry 710. The communication circuitry 710 is configured to transmit and/or receive information to and/or from one or more other nodes, e.g., via any communication technology. Such communication may occur via one or more antennas that are either internal or external to the authentication node 22-1. The processing circuitry 700 is configured to perform processing described above, e.g., in FIG. 4 or FIG. 8, such as by executing instructions stored in memory 720. The processing circuitry 700 in this regard may implement certain functional means, units, or modules.

Figure 13:
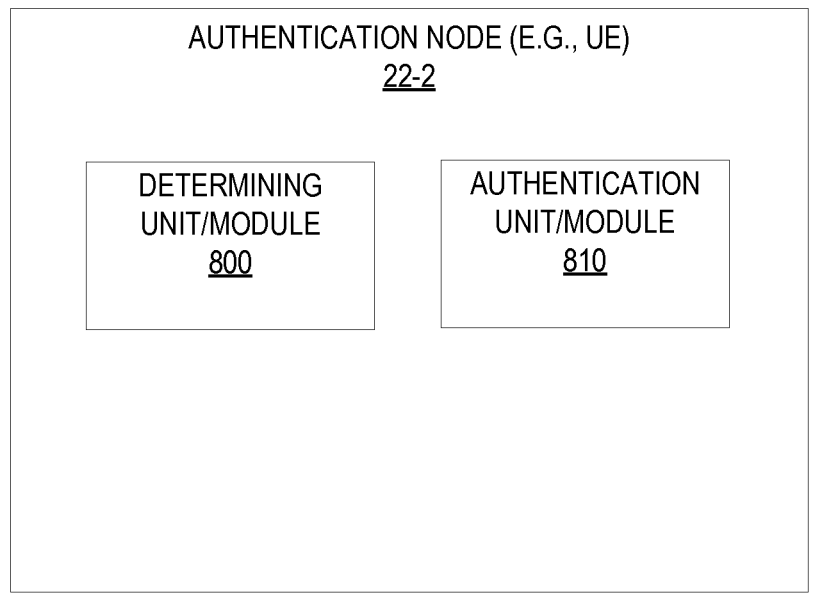
FIG. 13 is a block diagram of an authentication node according to other embodiments.

FIG. 13 illustrates the authentication node 22 in the form of an authentication node 22-2 implemented in accordance with one or more other embodiments. As shown, the authentication node 22-2 implements various functional means, units, or modules, e.g., via the processing circuitry 700 in FIG. 12 and/or via software code. These functional means, units, or modules, e.g., for implementing the method in FIG. 9, include for instance a determining module or unit 800 for determining a radio resource that carries the message received by the recipient radio node. Also included is an authentication module or unit 810 for performing authentication of the message, by checking whether the message is (e.g., cryptographically) bound to the determined radio resource.

Those skilled in the art will also appreciate that embodiments herein further include corresponding computer programs.

A computer program comprises instructions which, when executed on at least one processor of a node, cause the node to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of a node, cause the node to perform as described above.

Embodiments further include a computer program product comprising program code portions for performing the steps of any of the embodiments herein when the computer program product is executed by a computing device. This computer program product may be stored on a computer readable recording medium.

In general, therefore, one or more embodiments herein bind a message with its radio resource. In some embodiments, such binding prevents replay attacks. In a radio transmission, both the sender and the receiver have information about the radio resources used in the transmission and the reception respectively. The sender in some embodiments binds the transmitted message with the radio resources used for the transmission, i.e. the radio resource information is used in the calculation of a message integrity check value. The receiver in some embodiments verifies that the binding between the received message and the radio resources used for the reception is correct, i.e. the radio resource information is used in the calculation of the expected message integrity check value. The sender may use the Tx radio resource in the calculation of message integrity check value and the receiver may use the Rx radio resource in the calculation of expected message integrity check value. Examples of radio resource information in FDD LTE may be for instance: resource block number, carrier frequency, resource element subcarrier number, resource element slot number, resource element symbol number, or one or more combinations of them.

In general, though, one or more embodiments herein mitigate against replay attack in different time and frequency domain. By using fine grained radio resource information, some embodiments can also mitigate against replay attacks in a different geographic location (e.g., it would take some time to capture a message in one geographic location and move to a different geographic location for replaying that captured message in a spatial replay attack). Furthermore, one or more embodiments herein work for broadcast and multicasts messages as well unlike, for example, when using a sequence number is used. Alternatively or additionally, some embodiments do not require any additional field to be included in a message unlike, for example, a sequence number or timestamp. No extra field in the message means short length or size, i.e. efficient use of radio resource. And no extra field means that processing of message, both at the sender and the receiver, might be fastened. Still further, some embodiments do not require any additional memory, for example, to store and increment a sequence number. Indeed, the radio resource information used herein may be available to the sender and the receiver as a part of normal operation, and therefore, some embodiments do not require any additional source of information unlike, for example, getting timestamp from network or GPS component. In this regard, some embodiments do not require any additional resynchronization that might be necessary in other methods, for example sequence number out of sync or timestamp out of sync.

What is claimed is:

1. A method for authenticating a message received by a recipient radio node in a wireless communication system, the method comprising an authentication node:
    determining a radio resource that carries the message received by the recipient radio node;
    performing authentication of the message by checking whether the message is bound to the determined radio resource; and
    receiving binding information associated with the message,
        wherein the binding information indicates a radio resource on which the message is restricted to being carried, and
        wherein the checking comprises checking whether the determined radio resource matches the radio resource indicated by the binding information.

2. The method of claim 1, wherein the checking comprises checking whether the message is cryptographically bound to the determined radio resource.

3. The method of claim 1, wherein the checking comprises:
    computing an expected authentication or integrity code based on information identifying the determined radio resource; and
    checking whether the expected authentication or integrity code matches an authentication or integrity code associated with the message.

4. The method of claim 1, wherein the checking comprises checking whether a radio resource on which the message was sent to the recipient radio node, or a radio resource on which the message was expected to be received by the recipient radio node, corresponds to a radio resource on which the message was received by the recipient radio node.

5. The method of claim 1:
    further comprising receiving binding information indicating a radio resource on which a sender radio node transmitted the message to the recipient radio node,
    wherein the determining comprises determining the radio resource that carries the message as being a radio resource on which the recipient radio node received the message from the sender radio node; and
    wherein the checking comprises checking whether the radio resource on which the recipient radio node received the message corresponds to the radio resource on which the sender radio node transmitted the message, as indicated by the binding information.

6. The method of claim 1, wherein the determining comprises determining the radio resource that carries the message as being a radio resource on which the message is received by the recipient radio node.

7. The method of claim 1, wherein the determining comprises determining the radio resource that carries the message as being a radio resource on which the message was expected to have been transmitted to the recipient radio node.

8. The method of claim 7, further comprising determining the radio resource on which the message was expected to have been transmitted to the recipient radio node, by:
    determining a radio resource on which the message is received by the recipient radio node;
    determining the radio resource on which the message was expected to have been transmitted to the recipient radio node, as being a radio resource which is offset by a determined amount from the radio resource on which the message is received by the recipient radio node.

9. The method of claim 1, further comprises transmitting, to the recipient radio node, information that indicates a result of the authentication or information whose transmission is conditioned upon the message being authenticated.

10. The method of claim 1:
    wherein the authentication node is the recipient radio node;
    wherein the method further comprises receiving the message and processing the message responsive to authenticating the message.

11. A method for securing transmission of a message from a sender radio node to a recipient radio node in a wireless communication system, the method comprising the sender radio node:
    determining a radio resource that carries the message to the recipient radio node;
    binding the message to the determined radio resource for authenticity, wherein the binding comprises generating binding information that indicates that the message is restricted to being carried on the determined radio resource;

transmitting the binding information to an authentication node configured to authenticate the message using the binding information; and transmitting the bound message to the recipient radio node on the determined radio resource.

12. An authentication node for authenticating a message received by a recipient radio node in a wireless communication system, the authentication node comprising:

processing circuitry;

memory containing instructions executable by the processing circuitry whereby the authentication node is operative to:

determine a radio resource that carries the message received by the recipient radio node;

perform authentication of the message by checking whether the message is bound to the determined radio resource; and receive binding information associated with the message, wherein the binding information indicates a radio resource on which the message is restricted to being carried, and wherein the checking comprises checking whether the determined radio resource matches the radio resource indicated by the binding information.

13. A sender radio node for securing transmission of a message from the sender radio node to a recipient radio node in a wireless communication system, the sender radio node comprising:

processing circuitry;

memory containing instructions executable by the processing circuitry whereby the sender radio node is operative to:

determine a radio resource that carries the message to the recipient radio node;

bind the message to the determined radio resource, wherein the binding comprises generating binding information that indicates that the message is restricted to being carried on the determined radio resource transmit the binding information to an authentication node configured to authenticate the message using the binding information; and transmit the cryptographically bound message to the recipient radio node on the determined radio resource.

14. A non-transitory computer readable recording medium storing a computer program product for controlling an authentication node for authenticating a message received by a recipient radio node in a wireless communication system, the computer program product comprising software instructions which, when run on processing circuitry of the authentication node, causes the authentication node to:

determine a radio resource that carries the message received by the recipient radio node;

perform authentication of the message by checking whether the message is bound to the determined radio resource; and receive binding information associated with the message, wherein the binding information indicates a radio resource on which the message is restricted to being carried, and wherein the checking comprises checking whether the determined radio resource matches the radio resource indicated by the binding information.

\* \* \* \* \*